E. G. BAILEY.
FLOW METER.
APPLICATION FILED MAR. 22, 1915.

1,248,057.

Patented Nov. 27, 1917.

WITNESSES:
M. J. Maloney.
Jas. J. Maloney.

INVENTOR.
Erwin G. Bailey,
BY
ATTORNEY.

UNITED STATES PATENT OFFICE.

ERVIN G. BAILEY, OF NEWTON HIGHLANDS, MASSACHUSETTS, ASSIGNOR TO BAILEY METER COMPANY, A CORPORATION OF MASSACHUSETTS.

FLOW-METER.

1,248,057.  Specification of Letters Patent.  Patented Nov. 27, 1917.

Application filed March 22, 1915. Serial No. 16,021.

*To all whom it may concern:*

Be it known that I, ERVIN G. BAILEY, a citizen of the United States, residing in Newton Highlands, in the county of Middlesex and State of Massachusetts, have invented an Improvement in Flow-Meters, of which the following description, in connection with the accompanying drawings, is a specification, like letters on the drawings representing like parts.

The present invention relates to a flow meter and is embodied in a meter in which the rate of flow is determined by comparing the pressures of a fluid flowing through a duct at opposite sides of an obstruction in said duct, which causes a drop in pressure which varies with the rate of flow. In accordance with the present invention the obstruction consists of a plate or diaphragm which extends across the duct, the said plate which may be termed an "orifice plate" being provided with an aperture smaller in diameter than the duct, thus obstructing without preventing the flow of fluid.

The duct is provided at opposite sides of the plate with pipes leading to any suitable measuring instrument, such as a differential pressure gage through which the varying differences of pressure can be indicated, and the instrument graduated in such units as may be desired.

The present invention relates mainly to a novel construction of the orifice plate as it will be hereinafter termed, and also to the way in which the plate is installed.

In accordance with the invention the orifice plate consists of a disk of metal, preferably what is known to the trade as Monel metal, of larger diameter than the inner diameter of the flow duct, the outer portion of said disk having the characteristics of metallic packing and being adapted to be clamped between the sections of the main duct, to pack the joint.

Figure 1:
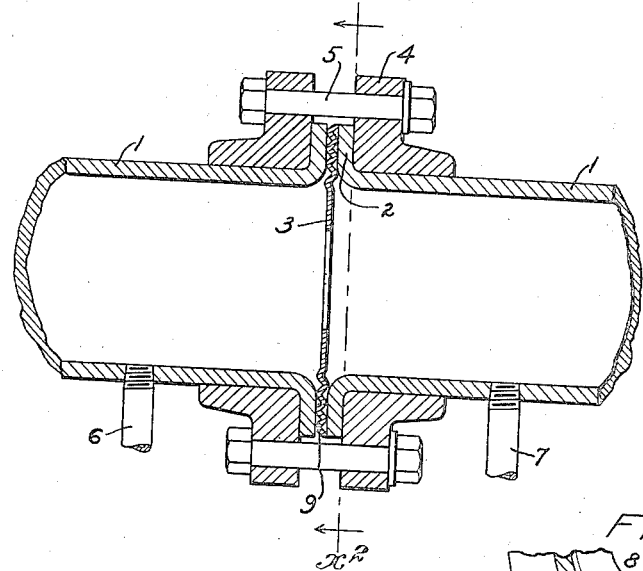
Figure 2:
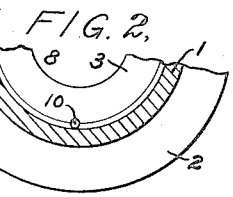
Figure 3:
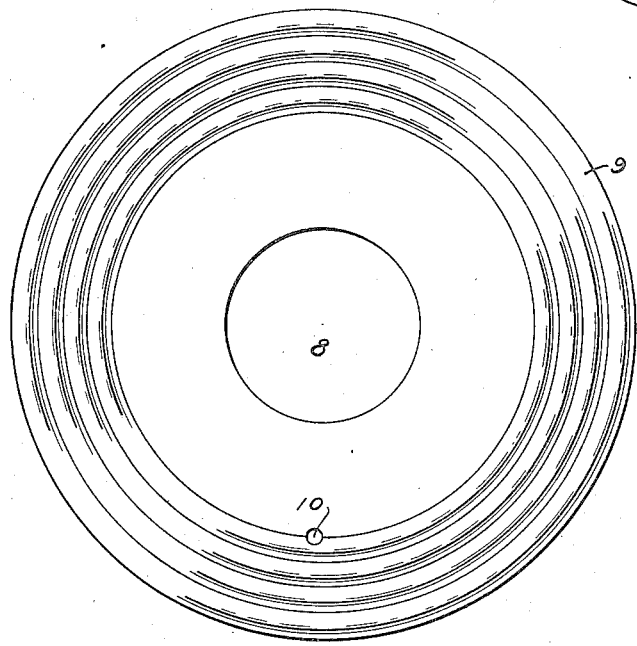

Figure 1 is a horizontal longitudinal section of a flow duct with the orifice plate in position; Fig. 2 is a transverse section on line $x^2$ of Fig. 1; and Fig. 3 is a face view of the orifice plate alone.

Referring to Fig. 1, the flow duct is indicated as a pipe 1 formed in two sections, the ends of which are shaped to form annular flanges 2, adapted to be clamped together with the orifice plate 3 between them, as by clamping rings 4 and bolts 5.

The two sections of the duct 1 at opposite sides of the orifice plate are provided respectively with pipes 6 and 7, which lead to a suitable measuring instrument, (not shown) the indicating part of which responds to the difference in pressure between the pressure conveyed by the pipe 6 and the pressure conveyed by the pipe 7, the latter pressure (assuming that the fluid is flowing in the direction of the arrow which indicates the direction in which the section is taken) being lowered by the resistance afforded by the plate 3.

The said plate 3, as shown in Fig. 2, consists of a metallic disk provided in the middle with the aperture 8 which is smaller in diameter than the duct or pipe 1 and is also provided with an integral part around its outer edge which has the characteristics of packing. As herein shown, the packing characteristic is afforded by corrugations 9, which, as shown in Fig. 1, extend between the flanges 2, so that when the said flanges are clamped together, the corrugated part is slightly crushed between them thus efficiently packing the joint. This obviates the necessity of using separate packing at opposite sides of the plate, thus simplifying the installation of the device.

In the construction shown, that portion of the plate which extends from the edge of the orifice to the wall of the duct is flat, this being desirable in order to avoid unnecessary disturbance of the fluid as it flows through.

When the device is used as a steam flow meter, and the duct for the steam is horizontal, I make in the plate a small drain opening 10 close to the bottom of the duct, so as to prevent trapping of condensate, the opening being or sufficient size to allow the free passage thereof.

What I claim is:

1. In a flow meter the combination with a duct for the flowing fluid; of a plate extending across the said duct in the path of the flowing fluid, said plate being provided with an aperture smaller in diameter than the duct and also with a small drain opening adjacent to the wall of the duct.

2. An orifice plate for flow meters adapted to obstruct the flow of fluid through a duct, comprising a disk having an aperture smaller than the bore of the duct through which the fluid flows, said disk having a flat surface surrounding the aperture and being in the path of the flowing fluid; and said disk having its marginal portion formed to constitute packing means surrounding said flat surface and being integral with the plate.

3. An orifice plate for flow meters adapted to obstruct the flow of fluid through a duct, comprising a metallic disk provided with an aperture in the middle surrounded by a flat portion adapted to lie in the path of the flowing fluid, said disk also having a corrugated portion extending from said flat portion to the outer edge of the plate.

4. An orifice plate adapted to be placed in a pipe between pipe-flanges on adjacent pipe sections, comprising a disk having an aperture smaller in diameter than the pipe, a corrugated portion adapted to lie between the flanges; and a flat portion extending from the edge of the aperture to the corrugated portion.

5. An orifice plate for flow meters comprising a metallic disk provided with an aperture, a flat surface surrounding said aperture, a corrugated surface adjoining the flat surface; and a drain opening where the flat surface adjoins the corrugated surface.

In testimony whereof, I have signed my name to this specification in the presence of two subscribing witnesses.

ERVIN G. BAILEY.

Witnesses:
 JAS. J. MALONEY,
 M. L. MALONEY.